United States Patent Office 2,849,371
Patented Aug. 26, 1958

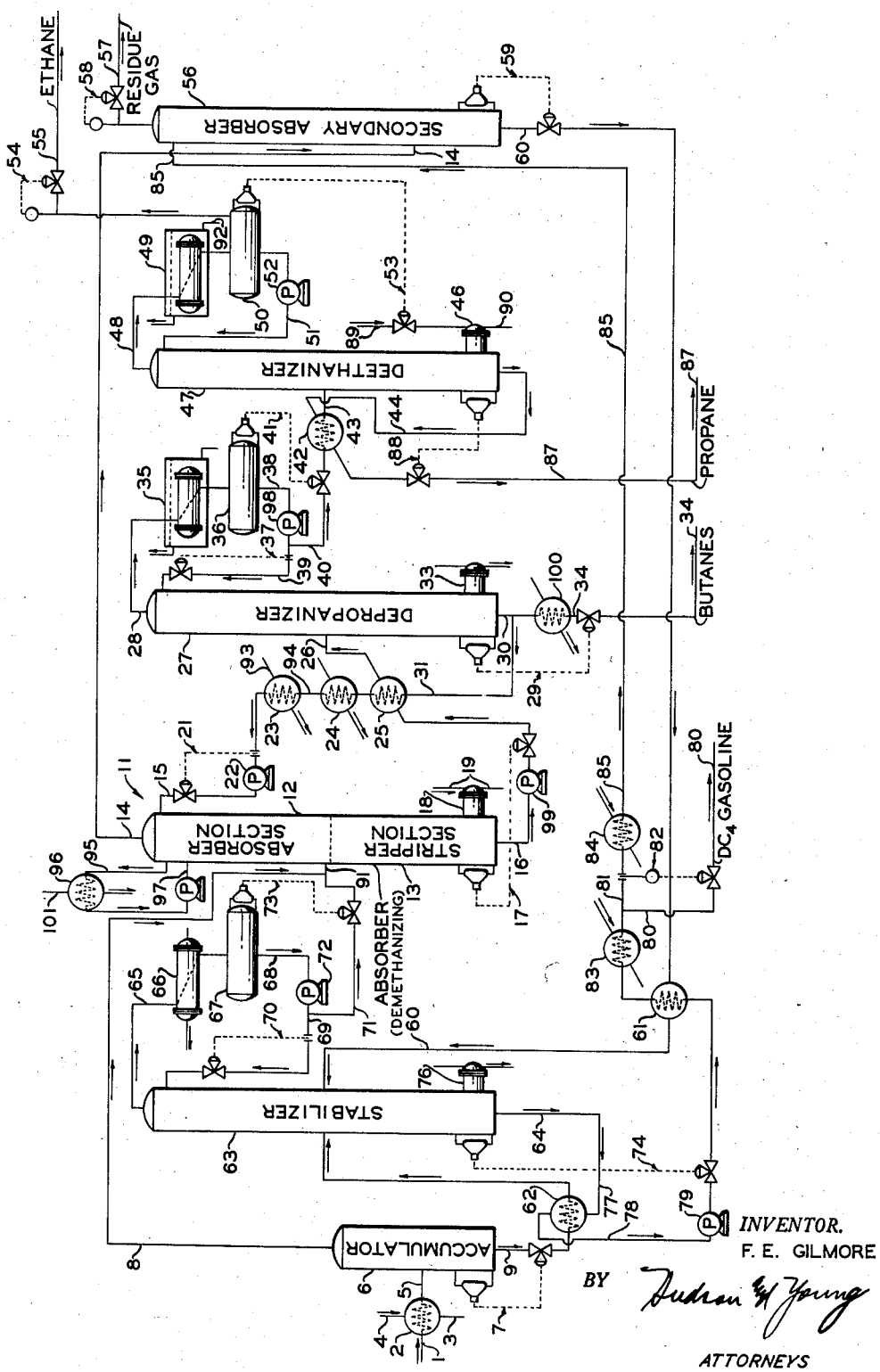

2,849,371
SEPARATION AND RECOVERY OF HYDROCARBONS FROM GASEOUS MIXTURES THEREOF

Forrest E. Gilmore, Bartlesville, Okla., assignor to Phillips Petroleum Company, a corporation of Delaware Application September 27, 1954, Serial No. 458,448

9 Claims. (Cl. 196—8)

This invention relates to a method for the separation and recovery of the low boiling components of a natural gas, and of a refinery or synthetic gas containing normally gaseous hydrocarbons. In one aspect it relates to a method for the separation and recovery of ethane, propane and butanes in relatively high degrees of purity and in high yields. In another aspect it relates to a method for separating such normally gaseous hydrocarbons from natural gases using only a minimum of pressure producing pumps and without employment of low temperature refrigeration. In another aspect it relates to a method for separating and recovering such gases at minimum temperatures of about 60° F.

In the separation and recovery of, for example, ethane, propane, butane and gasoline from natural gases containing these materials, conventional processing usually requires temperatures obtained only by costly refrigeration. It is well known that any process involving the use of such low temperatures as are obtainable only by refrigeration are very costly to operate. Similarly, processes involving high pressures are also costly to operate. I have found that by coupling pressure of an intermediate range with about the lowest temperatures which can be obtained by heat transfer with water, natural gas hydrocarbons can be separated into products comprising the several hydrocarbons in relatively high degrees of purity and in relatively high yields.

One object of my invention is to provide a process for separating natural gas into its component hydrocarbons, which process is relatively inexpensive to operate.

Another object of my invention is to provide a method for separating natural gas into its component hydrocarbons without the use of costly refrigeration and excessively high pressure.

Yet another object of my invention is to provide a process for separating natural gases, and refinery gases containing components ordinarily present in natural gas, and other low boiling components, into component products without use of refrigeration and without the use of exceedingly high pressure.

Yet another object of my invention is to provide a method for separating and recovering component hydrocarbons from such gases into products in relatively high yields coupled with high degrees of purity.

Still other objects and advantages of my invention will be realized upon reading the following description which taken with the attached drawing respectively describes and illustrates a preferred embodiment of my invention.

The drawing illustrates, in diagrammatic form, one arrangement of apparatus for carrying out the process of my invention.

I will describe my invention employing a natural gas as a feed stock merely as an example of the broad aspects of my invention. The process is equally applicable to the separation of the various hydrocarbons or groups of hydrocarbons from refinery gases containing normally gaseous hydrocarbons and easily condensible normally liquid hydrocarbons.

My process as applied to the treatment of a vaporous mixture of low boiling hydrocarbons comprises introducing a mixture of normally gaseous hydrocarbons and easily vaporized normally liquid hydrocarbons under superatmospheric pressure into a phase separating zone and therein separating a liquid phase from a vapor phase and introducing the separated vapor phase into a demethanizing zone, withdrawing an overhead vaporous material and a liquid bottoms material from said demethanizing zone, introducing said liquid bottoms material into a depropanizing zone and withdrawing an overhead vaporous stream comprising propane and ethane, and introducing this latter stream into a deethanizing operation and therefrom recovering a first product comprising ethane and a second product comprising propane, withdrawing said liquid phase from said phase separating zone and introducing same into a stabilizing zone, removing vaporous material from the stabilizing zone and introducing same into said demethanizing zone, removing stabilized gasoline from said stabilizing zone, dividing this removed gasoline into two portions, removing one portion as another product of the process and introducing the other portion and the withdrawn overhead vaporous material from said demethanizing zone into a secondary absorption zone, removing an overhead gaseous material comprising methane as another product, removing gasoline containing absorbed hydrocarbons from said secondary absorption zone and introducing same into said stabilizing zone, dividing the bottoms material from the depropanizing zone into two portions, introducing one portion into the demethanizing zone as an absorbent and removing the other portion as another product of the process.

My process exhibits a number of advantages over conventional processes for treating natural or similar gases for separation and recovery of hydrocarbon components. One advantage is I am able to obtain a higher recovery of $C_2$ and $C_3$ hydrocarbons without having to employ conventional refrigeration or excessively low temperature. Another advantage of my process is that practically all of the $C_5$ and higher boiling hydrocarbons can be condensed ahead of the first absorption operation and after stabilization of the condensate in a debutanizing operation, the debutanized liquid can advantageously be used as an absorption oil in a secondary absorber for removing the more easily condensible hydrocarbons from the off gas of the demethanizing operation. Another advantage is that the butane and lower boiling hydrocarbons separated in the stabilizing or debutanizing operation are combined with the normally gaseous components on their way to the demethanizing step. Still another advantage of my invention is that the rich oil from the demethanizing absorber contains such a small concentration of $C_5$ and higher boiling hydrocarbons that it can be fractionated at high enough pressure to recover a relatively pure $C_2$, $C_3$ overhead fraction, which separation would be impossible when using conventional high molecular weight absorption oil. Also in my demethanizing operation the use of partial pressure steam is completely avoided. Another advantage in my invention is that about ⅓ as much butane is required for the same ethane absorption as when absorption oil of 180 molecular weight at conventional temperatures, thus the liquid capacity of the absorber as well as the heating and cooling requirements of the process are greatly reduced. Another important advantage of my process is that the absorber and fractionators operate at nearly the same pressure so that a minimum of pumps are required and a minimum of power is required to operate these pumps. Still another advantage of my invention is that for a reasonable recovery of ethane, 50 to 80 percent, depending upon the ethane concentration of the gas being treated, the refrigeration requirements at at a level at which they can be supplied at a very high degree of efficiency and with relatively inexpensive equipment, and furthermore, the gas will usually not need to be dehydrated to prevent hydrate formation at any point in the process.

Referring to the drawing and the data hereinafter disclosed setting forth operating conditions for a feed material of the composition shown, and as an example of the operation of my process, a charge stock such as natural or refinery gas containing at least a low concentration of normally liquid hydrocarbons is passed through a pipe 1, from a source, not shown, into a heat exchanger 2. Cooling water at the temperature of about 50° F. enters exchanger 2 through a pipe 4 and exits through a pipe 3 for subsequent use or treatment as desired. The natural gas according to this example is at such a pressure that it passes from exchanger 2 through a pipe 5 into an accumulator or phase separator 6. Pressure in this phase separator is about 465 p. s. i. a. (pounds per square inch absolute) hereinafter will be given in terms of pounds per square inch absolute and for brevity this term will be abbreviated, p. s. i. a. The vapor phase from the separator tank 6 is passed through a pipe 8 and is introduced into about the mid-section vertically of a demethanizing absorber 11. This vessel is composed of actually two sections, the section above the feed level is identified by reference numeral 12 and is termed the absorption section, and the section below the feed level is identified by reference numeral 13 and is herein called the stripping section. Since there are no valves nor pumps nor other apparatus in pipe 8 to interfere with the flow of vapors the pressure in the demethanizing absorber at the level of the feed inlet is about 463 p. s. i. a. It is noted that this pressure is two pounds less than that maintained in the separator 6 and this slight difference in pressure is accounted for by the normal pressure drop in such a length of pipe as would be required to conduct the vapors from accumulator 6 to the absorber. An absorption oil, which will be subsequently described, is introduced into the top of the absorption section 12 through a pipe 15 and serves to absorb the major portion of hydrocarbons boiling higher than methane. This absorbent butane enters the absorber section 12 at a temperature about 60° F. On passing down through the absorber section 12 this absorbent butane absorbs the above mentioned hydrocarbons until such time as it reaches the feed inlet level. On passing downward through the stripping section 13 the absorbent butane and its charge of absorbed hydrocarbons are heated through reboiler 18 by steam or other heating medium which enters and leaves via pipes 19. A reboiler temperature of about 207° F. is maintained in the kettle section of the stripper 13 in an attempt to strip out from the absorbent butane as much of the methane as possible and yet retain as high a concentration as possible of the hydrocarbons higher boiling than methane. As mentioned above the pressure at the feed inlet level of the demethanizing absorber 11 is about 463 p. s. i. a., the pressures at the top and in the reboiler of this column are about 459 and 468 p. s. i. a. respectively. The off-gas from this absorber is removed therefrom through a pipe 14 and is passed to a secondary absorber which will be described hereinafter. The bottoms product is removed from the kettle of the stripping section 13 via pipe 16 by a pump 99 and its removal is regulated by a liquid level controller apparatus 17. This bottoms product is passed on through a heat exchanger 25 which adds some heat prior to its introduction into a depropanizer vessel 27 via pipe 26. Heat for use in the heat exchanger 25 is obtained from the kettle product from this depropanizer, which kettle product is withdrawn through a pipe 30 and is passed on through a pipe 31 into the heat exchanger 25. That portion of the depropanizer kettle product not passed through pipe 31 is passed through a pipe 34 and heat exchanger 100 as another product of the process comprising n-butane and isobutane. Since the amount of depropanizer kettle product required for passage through pipe 31 is constant the rate of passage of the butanes through pipe 34 is regulated by a liquid level controller apparatus 29 in response to the level of the kettle product in the depropanizer. Steam or other heating medium is used for supplying heat to an exchanger 33 which adds sufficient heat to the column to maintain a kettle temperature of about 280° F. Vapors separated from liquid in this depropanizer are passed through a pipe 28 and are cooled in an exchanger 35. This exchanger 35 can be a flooded condenser, if desired. Condensate from condenser 35 flows into an accumulator or receiver tank 36. Condensate is removed therefrom through a pipe 38 under the influence of a pump 98 and that portion required for refluxing the column is passed through a pipe 39 as regulated by a rate of flow controller apparatus 37 into the upper section of the tower. It is intended that the condenser 35 be operated in such a manner that the contents of tank 36 are maintained at a temperature at about 100° F. at a pressure of about 465 p. s. i. a. A liquid level controller apparatus 41 regulates the withdrawal of the liquid from tank 36, not required for refluxing, for passage through a pipe 40, heat exchanger 42 and pipe 43 into deethanizer 47. In heat exchanger 42 this liquid is heated by hot reboiler product from the kettle of column 47. The pump 98, which pumps a portion of the condensate from vessel 36 into the depropanizer 27 as reflux and the remainder through pipes 40 and 43 into the deethanizer 47 is such that a pressure of about 500 p. s. i. a. can be maintained in the deethanizer reflux accumulator 50. A back pressure regulator apparatus 54 retains this pressure in accumulator 50. In this deethanizer 47 and under said conditions a product comprising ethane is removed through an overhead pipe 48 to a reflux condenser 49. This reflux condenser 49 is cooled by cooling water at a temperature of about 50° F. from a pipe 92. Condensed and uncondensed materials from condenser 49 are passed to accumulator 50 in which phase separation occurs and condensate is passed through a pipe 51 under the influence of a pump 52 to reflux the column. Steam or other heating medium for supplying reboiling heat to reboiler 46 passes through a pipe 89 and leaves through a pipe 90. The steam for reboiling this column is regulated by a float controller assembly 53 in response to the level of condensate in the accumulator 50 and maintains a kettle temperature of about 190° F. The float controller 53 operates in such a manner that as the level of condensate in the accumulator 50 increases, the rate of flow of steam in pipe 89 is throttled, and similarly when the level of condensate in accumulator 50 becomes lower than a predetermined level the float controller operates to open the valve in pipe 89 and to permit the flow of more steam to the exchanger 46. The uncondensed gases from accumulator vessel 50 are removed through a pipe 55 as the ethane product of the process and this gas removal is regulated by back pressure regulator 54. The deethanizer kettle product is passed through a pipe 44 to supply heat to the exchanger 42 for heating the feed to the deethanizer. The heating medium leaves exchanger 42 through a pipe 87 and is the propane product of the process. The rate of removal of this propane product through pipe 87 is regulated by a liquid level controller apparatus 88 in response to the level of the liquid in the kettle section of the deethanizer 47.

That portion of the butanes from the kettle of the depropanizer which is passed through pipe 31 is cooled somewhat in the exchanger 25 and is further cooled in an exchanger 24 to about 100° F. by conventional plant cooling water. This cooled material from exchanger 24 is passed through an exchanger 23 in which it is further cooled with about 50° F. cooling water which enters this exchanger through a pipe 93. This exchanger 23 cools material from pipe 94 to about 60° F. and this so cooled material passes on through pipe 15 into the upper portion of the demethanizing absorber as the absorbent butane hereinbefore mentioned. The rate of flow of absorbent butane in pipe 15 is regulated by a rate of flow controller 21. A pump 22 serves to pump this absorbent butane into the top of the absorber 11.

The liquid material which separated in the original accumulator or phase separation vessel 6 is passed through a pipe 9 into a heat exchanger 62 and thence into about the mid-section vertically of a stabilizer vessel 63. The flow of this liquid phase from accumulator 6 is regulated by a liquid level controller apparatus 7 in response to the level of the liquid phase in this accumulator. Heat supplied to the liquid flowing through pipe 9 in exchanger 62 will be described hereinbelow. Feed liquid entering stabilizer 63 is the more easily condensed portion of the gas feed to the process and such a liquid always contains more or less dissolved gaseous hydrocarbons. The purpose of this stabilizer is to remove the dissolved normally gaseous materials so as to produce a stable gasoline. This stabilizer is operated with a kettle temperature of about 440° F. at about 410 p. s. i. a. The stabilizer overhead is passed through a pipe 65 to a reflux condenser 66 which is cooled with ordinary plant cooling water. Condensate passes on into an accumulator vessel 67 and condensate is removed therefrom through a pipe 68 under the influence of a pump 72 and that portion of the condensate required for refluxing the column is passed through a pipe 69 into the top of the column. Rate of flow of reflux through pipe 69 is regulated by a rate of flow controller apparatus 70. That portion of condensate not required for refluxing is passed through a pipe 71 and is added to the vapor phase flowing through pipe 8 which addition point is prior to entry of the latter into the demethanizing absorber 11. Pipe 71, if desired, could be attached directly to the demethanizing absorber 11 in place of being attached to pipe 8 as shown. The flow of the stabilizer overhead condensate through pipe 71 is regulated by a liquid level float controller apparatus 73 in response to the level of the condensate in the accumulator tank 67. Cooling water is flowed through the condenser 66 at such a rate that the material in the accumulator 67 is maintained at a temperature of about 100° F. at a pressure of about 400 p. s. i. a.

Steam or other heating medium is supplied to heat exchanger 76 in such a quantity as to maintain a kettle temperature of about 440° F. Bottoms material in the stabilizer 63 is withdrawn through a pipe 64 and is passed through a line 77 and through the aforementioned heat exchanger 62 in which feed stock to the stabilizer is heated. In this exchanger 62 the stabilizer bottoms is cooled and is transferred therefrom under the influence of a pump 79, the flow being regulated by a liquid level float controller assembly 74, on through exchangers 61 and 83. Exchanger 83 is cooled by ordinary plant cooling water and imparts sufficient cooling to the stabilizer bottoms that they emerge from the exchanger at a temperature of about 100° F. This so cooled material is divided into two portions one portion passing from a pipe 81 through a pipe 80 as a debutanized (DC$_4$) gasoline product of the process. The remaining portion of this debutanized gasoline passes on through pipe 81 to another heat exchanger 84 which is cooled by 50° F. cooling water and the gasoline is cooled to a temperature of about 60° F. Since the rate of flow of debutanized gasoline entering exchanger 84 is desired to be constant, a rate of flow controller assembly 82 is installed as shown in pipes 81 and 80 to regulate the rate of gasoline flow through pipe 80 in response to the rate of flow of gasoline through pipe 81. From the heat exchanger 84 this gasoline material flows through a pipe 85 into the upper portion of a secondary absorber vessel 56. In this secondary absorber 56 this debutanized gasoline as an absorbent flows downward and contacts upward flowing gas introduced into the lower portion thereof, through pipe 14 from the top of the demethanizing absorber 11. This secondary absorber is intended to extract the relatively high boiling hydrocarbons from the off-gas of the demethanizing absorber prior to their passage from the system as residue gas. The residue gas stripped of the major portion of the condensible hydrocarbons is removed from this absorber through a pipe 57 in response to a back pressure controller apparatus 58. The enriched absorbent gasoline is removed from the bottom of the secondary absorber 56 through a pipe 60 and is passed through the heat exchange 61 into about the mid-section vertically of the stabilizer 63. In the stabilizer 63 it is intended that the more difficultly condensible hydrocarbons (butanes and lighter) absorbed in the secondary absorber be stripped from the gasoline and recovered. The rate of removal of this enriched gasoline from the bottom of the absorber 56 is regulated by a liquid level flow controller apparatus 59.

The absorbent butane flowing through pipe 15 into the top of the demethanizing absorber enters the absorber at about 60° F. Because the absorption process is exothermic temperature of the absorption liquid increases on its way down the tower and to maintain this absorption liquid in a highly absorbent condition, one or more intercooling exchangers 96 are provided. At least a portion of the absorbent is removed from the absorption section 12 through a pipe 95, is passed through the exchanger 96 and is returned to the tower through pipe 97. This exchanger 96 is intended to cool the withdrawn partially enriched absorbent with water at about 50° F. from a pipe 101 and it is intended that this absorbent be recooled to a temperature of about 60° F.

A pipe 91 conducts the combined stream of the separated vapor phase from accumulator 6 and the overhead condensate of stabilizer 63, not required for refluxing the stabilizer, into the demethanizing absorber.

Summing up the cooling requirements of my system, coolers or exchangers 2, 23, 49, 84 and 96 require cooling water at a temperature of about 50° F. such water can frequently be obtained directly from water wells and can be conducted directly to these exchangers without expensive cooling. Exchangers 24, 83 and 100 and condensers 35 and 66 are intended to cool the various streams to a temperature of about 100° F. and these exchangers and condensers can be operated with plant cooling water coming directly from the plant cooling system. Heaters 18, 33, 46, and 76 are heaters such as required for reboiling purposes and these heaters can be operated with steam or other heating medium as required. It should be noted that using a natural gas as an example of the operation of my process the accumulator or phase separator 6 is operated at a pressure of about 465 p. s. i. a. The pressure in the demethanizing absorber 11, at the feed level, is about 463 p. s i. a. while the pressure in the depropanizer 27 is about 465 p. s. i. a. A pump is not needed for passage of vapor from the phase separator 6 into the demethanizing absorber. A pump is required for passing kettle product from the demethanizing absorber into the depropanizer but since the kettle of the demethanizer is maintained at about a pressure about 468 p. s. i. a. and the reflux accumulator pressure of the depropanizer is maintained at about 465 p. s. i. a. the power required to operate pump 99 is very small. The pressure maintained in accumulator 50 is about 500 p. s. i. a. and accordingly a pump 98 is required for pumping depropanizer overhead condensate into the deethanizer but the power requirement for operating this pump is also reasonably small. The pump has a suction pressure of about 465 p. s. i. a. and a discharge slightly about 500 p. s. i. a.

The stabilizer 63 is operated at a reflux accumulator pressure at about 400 p. s. i. a. and of course a pump is not required for passage of feed stock from the phase separator 6 into this stabilizer. A pump 79 is required for transfer of stabilizer bottoms into the secondary absorber 56 because this absorber is operated at a pressure about 457 p. s. i. a. but similar to pump 98 power requirements for pump 79 are fairly small because it merely transfers liquid from a pressure of about 400 p. s. i. a. to a pressure of about 457 p. s. i. a.

Thus, it is seen that according to my process when a natural gas is charged to the system at a pressure of about 465 p. s. i. a. very little power is required for all subsequent purposes. It should be further noted that low temperature refrigeration is not required, the lowest temperature being about 50° F. and water at this temperature can in many locations be obtained at that temperature or very nearly that temperature directly from water wells. Any other cooling required can be that from ordinary recirculated plant water. The following tabulation lists the composition of the contents of the various vessels and streams. The vessels or streams in this tabulation are identified by the appropriate reference numerals and all compositions are given in terms of mols per hour. Several of the gaseous products are given in terms of thousands of cubic feet per day (MSCFD). The quantity flow of some liquid streams is given in terms of gallons per minute (G. P. M.).

The tabulation also includes temperatures and pressures at various process points.

The final portion of the tabulation lists the recovery of the ethane, propane, butanes and $iC_{5+}$ (gasoline) products in terms of percentage along with their purities.

| Stream or vessel No. | 1 | 9 | 8 | 91 | 71 |
|---|---|---|---|---|---|
| Component, mols per hr.: | (Feed) | | | | |
| $C_1$ | 73.42 | 1.60 | 71.82 | 77.11 | 5.29 |
| $C_2$ | 9.12 | 0.84 | 8.28 | 9.94 | 1.66 |
| $C_3$ | 9.58 | 2.12 | 7.46 | 9.58 | 2.12 |
| $iC_4$ | .87 | 0.34 | 0.53 | 3.32 | |
| $nC_4$ | 3.53 | 1.63 | 1.90 | 13.03 | 13.92 |
| $iC_{5+}$ | 3.48 | 3.07 | 0.41 | 0.41 | |
| Total | 100.00 | 9.60 | 90.40 | 113.39 | 22.99 |
| MSCFD | | 910 | | 823 | |
| G. P. M. | | | 1.86 | | 4.0 |
| Pressure, p. s. i. a. | | | | | 465 |
| Temp., ° F. | | 100 | | 60 | 100 |

| Stream or vessel No. | 14 | 16 | 40 | 87 | 85 | 55 |
|---|---|---|---|---|---|---|
| Component: | | | | | | |
| $C_1$ | 76.96 | 0.15 | 0.15 | | | 0.15 |
| $C_2$ | 4.01 | 5.93 | 5.93 | 0.09 | | 5.84 |
| $C_3$ | 0 | 9.58 | 9.58 | 9.52 | | 0.06 |
| $iC_4$ | 12.00 | 127.35 | 0.30 | 0.30 | 0.28 | |
| $nC_4$ | | | | | | |
| $iC_{5+}$ | | 12.86 | | | 23.75 | |
| Total | 92.97 | 155.87 | 15.96 | 9.91 | 24.03 | 6.05 |
| G. P. M. | | 31.43 | 2.59 | 1.63 | 6.22 | |
| Pressure, lbs. | | | | | | |
| Lbs. abs. | 459 | | | | | |
| Temp., ° F. | | | | | 60 | |

| Stream or vessel No. | 57 | 34 | 60 | 78 | 15 |
|---|---|---|---|---|---|
| Component: | | | | | |
| $C_1$ | 73.27 | | 3.69 | | |
| $C_2$ | 3.19 | | 0.82 | | |
| $C_3$ | | | 0 | | |
| $iC_4$ | .03 | 4.05 | 12.25 | 0.30 | 123.00 |
| $nC_4$ | | | | | |
| $iC_{5+}$ | .98 | .41 | 22.77 | 25.84 | 12.45 |
| Total | 77.48 | 4.46 | 39.53 | 26.14 | 135.45 |
| G. P. M. | | 0.91 | 8.81 | 6.77 | 27.83 |
| P. s. i. a. | | | | | |
| Temp., ° F. | | | | | 60 |

| Stream or vessel No. | 5 | 71 | 80 | 92 | 93 | 97 |
|---|---|---|---|---|---|---|
| G. P. M. | | 4.0 | 0.55 | | | |
| Temp., ° F. | 60 | | | 50 | 50 | 60 |
| P. s. i. a. | | | | | | |

| Stream or vessel No. | 11 | 27 | 47 | 56 | 63 |
|---|---|---|---|---|---|
| Top: | | | | | |
| Temp., ° F. | | | | 65 | |
| P. s. i. a. | 459 | 470 | 505 | | 405 |
| Bottom: | | | | | |
| Temp., ° F. | 270 | 280 | 190 | | 440 |
| P. s. i. a. | 468 | | | 457 | 410 |

| Stream or vessel No. | 67 | 36 | 50 | 6 |
|---|---|---|---|---|
| Temp., ° F. | 100 | 100 | 60 | 60 |
| P. s. i. a. | 400 | 465 | 500 | 465 |

Recovery of— Ethane $= \frac{5.84 \times 100}{9.12} = 64\%$   Purity 96.7%

Propane $= \frac{9.52 \times 100}{9.58} = 99.4\%$   96.1%

Butanes $= \frac{4.40 \times 100}{4.05} = 92.2\%$   90.8%

Pumps 72, 22, 98 and 52 are required for pumping reflux or liquid absorbent into the respective towers. Reflux pumps ordinarily do not require excessively large amounts of power because back pressure to these pumps is ordinarily reflux accumulator pressure and they are required only to lift the reflux to the top of the tower and to overcome small pressure drops through the reflux system. Pumps 72 and 98 however, require somewhat larger power inputs because they not only pump reflux but also transfer reflux condensate from one point in the system to another point of somewhat higher pressure.

While I have illustrated the operation of my process by describing the separation of a natural gas into component hydrocarbons, I have mentioned that refinery gases are just as easily processed as natural gases. Refinery gases will contain in addition to n-paraffin and iso-paraffin hydrocarbons, such other hydrocarbons as ethylene, propylene, butylenes, and other unsaturated hydrocarbons as acetylenes, etc. Ethylene usually is recovered with ethane as a $C_2$ hydrocarbon mixture, propylene is usually recovered with propane as a $C_3$ mixture, and etc.

While the above flow diagram has been described for illustrative purposes, the invention obviously is not limited thereto.

I claim:

1. A method for treating a vaporous mixture of normally gaseous hydrocarbons and easily vaporized normally liquid hydrocarbons comprising separating said mixture at a superatmospheric pressure into a vapor phase and a liquid phase, intimately contacting in a demethanizing operation said vapor phase with a bottoms material as subsequently produced, withdrawing an overhead vaporous material and a liquid bottoms material from said demethanizing operation, depropanizing this withdrawn liquid bottoms material and withdrawing an overhead vaporous stream comprising propane and ethane, deethanizing this latter over head steam and from this deethanizing operation recovering a first product comprising ethane and a second product comprising propane, stabilizing the aforementioned liquid phase and from this stabilizing operation removing vaporous material and condensing same, introducing at least a portion of the condensate into said demethanizing operation, withdrawing stabilized gasoline from said stabilizing operation, removing one portion thereof as another product of the process and contacting the other portion with said overhead vaporous material in an absorbing operation, from this latter absorbing operation removing an overhead gaseous material as another product, introducing gasoline containing absorbed hydrocarbons from said latter absorption operation into said stabilizing operation, passing a portion of the bottoms from the depropanizing operation into said demethanizing operation as said bottoms material as subsequently produced and removing the remainder as another product of the process.

2. A method for treating a vaporous mixture of normally gaseous hydrocarbons and easily vaporized normally liquid hydrocarbons for separation and recovery of a gasoline comprising said normally liquid hydrocarbons and fractions of said normally gaseous hydrocarbons comprising introducing said mixture at a superatmospheric pressure into a phase separating zone and therein separating a liquid phase from a vapor phase, withdrawing said vapor phase from said separator and introducing the withdrawn vapor phase into a demethanizing zone, withdrawing an overhead vaporous material and a liquid bottoms material from said demethanizing zone, introducing said liquid bottoms material into a depropanizing zone and withdrawing an overhead vaporous stream comprising propane and ethane, and introducing this latter stream into a deethanizing operation and therefrom recovering a first product comprising ethane and a second product comprising propane, withdrawing said liquid phase from said phase separating zone and introducing same into a stabilizing zone, removing overhead material from the stabilizing zone, condensing removed overhead material, introducing at least a portion of this condensate into said demethanizing zone, removing stabilized gasoline from said stabilizing zone, dividing this removed gasoline into two portions, removing one portion as another product of the process and introducing the other portion and the withdrawn overhead vaporous material from said demethanizing zone into respectively the upper portion and the lower portion of a secondary absorption zone maintained under absorption conditions, removing an overhead gaseous material comprising methane from said secondary absorber as another product, removing gasoline containing absorbed hydrocarbons from said secondary absorption zone and introducing same into said stabilizing zone, dividing the bottoms material from the depropanizing zone into two portions, introducing one portion into the demethanizing zone as an absorbent and removing the other portion as another product of the process.

3. The method of claim 2 wherein the vaporous mixture of normally gaseous hydrocarbons and easily vaporized normally liquid hydrocarbons is a natural gas.

4. The method of claim 2 wherein the vaporous mixture of normally gaseous hydrocarbons and easily vaporized normally liquid hydrocarbons comprises a stream of refinery produced hydrocarbons.

5. The method of claim 2 wherein said superatmospheric pressure and the pressure maintained in each of the operational steps are between the approximate limits of 400 and 500 pounds per square inch absolute.

6. In the method of claim 2 maintaining the temperature in the phase separation step with cooling water at a minimum of about 50° F.

7. A method for treating a natural gas containing at least a minor proportion of condensible hydrocarbons comprising separating said natural gas at a pressure between 400 and 500 pounds per square inch absolute into a vapor phase and a liquid phase, intimately contacting in a demethanizing operation said vapor phase with absorbent liquid butane as subsequently produced, withdrawing vaporous overhead material from said demethanizing operation, removing absorbent liquid butane enriched in ethane and propane from said demethanizing operation, removing absorbed ethane and propane from the butane of the enriched absorbent and separating the ethane from the propane, and recovering the separated ethane and propane as separate products, dividing the absorbent butane from the enriched absorbent into two portions, removing one portion as another product of the process and returning the other portion to said demethanizing operation as said absorbent liquid butane as subsequently produced, removing butanes and lower boiling hydrocarbons from said liquid phase in a gasoline stabilizing operation and condensing same, and adding at least a portion of the condensate to the aforementioned vapor phase, from the stabilizing operation removing stabilized gasoline, dividing the removed stabilized gasoline into two portions, removing one portion as another product of the process and contacting the other portion with the withdrawn vaporous overhead material from said demethanizing operation in an adsorbing operation, from this latter operation recovering an off gas comprising methane as still another product of the process, and an absorbent gasoline enriched in butanes and returning this latter absorbent gasoline enriched in butanes to said stabilizing operation.

8. In the method of claim 7, separating said natural gas into said vapor phase and said liquid phase at a pressure of about 465 pounds per square inch absolute, and carrying out the demethanizing operation, the depropanizing operation, the deethanizing operation, the stabilizing operation and the absorption operation between the approximate pressure limits of 400 to 500 pounds per square inch absolute.

9. In the method of claim 8 maintaining the temperature in the phase separation operation, the top column temperatures in the demethanizing operation, in the deethanizing operation and in the adsorption operation with cooling water at a minimum temperature of about 50° F.

References Cited in the file of this patent

UNITED STATES PATENTS

| 2,240,433 | Atwell | Apr. 29, 1941 |
| 2,377,736 | White | June 5, 1945 |

OTHER REFERENCES

Stormont, "Oil & Gas Journal," February 24, 1949, pages 124–129, page 125 only needed.

UNITED STATES PATENT OFFICE
Certificate of Correction

August 26, 1958

Patent No. 2,849,371      Forrest E. Gilmore

It is hereby certified that error appears in the printed specification of the above numbered patent requiring correction and that the said Letters Patent should read as corrected below.

Column 2, line 68, for "at", first occurrence, read —are—; column 8, lines 14 and 15, for $=\frac{4.40\times100}{4.05}=$ read $=\frac{4.05\times100}{4.40}=$; same column 8, line 52, for "over head steam" read —overhead stream—; column 10, line 24, for "adsorbing" read —absorbing—; line 41, for "adsorption" read —absorption—.

Signed and sealed this 11th day of August 1959.

[SEAL]

Attest:
KARL H. AXLINE,
*Attesting Officer.*

ROBERT C. WATSON,
*Commissioner of Patents.*